United States Patent
Vuk

(10) Patent No.: US 7,950,231 B2
(45) Date of Patent: May 31, 2011

(54) LOW EMISSION TURBO COMPOUND ENGINE SYSTEM

(75) Inventor: Carl T. Vuk, Denver, IA (US)

(73) Assignee: Deere & Company, Moline, IL (US)

( * ) Notice: Subject to any disclaimer, the term of this patent is extended or adjusted under 35 U.S.C. 154(b) by 727 days.

(21) Appl. No.: 11/925,128

(22) Filed: Oct. 26, 2007

(65) Prior Publication Data

US 2009/0107123 A1     Apr. 30, 2009

(51) Int. Cl.
  *F02G 3/00*     (2006.01)
  *F02B 33/44*    (2006.01)
  *F01N 3/00*     (2006.01)

(52) U.S. Cl. ............ 60/624; 60/614; 60/605.2; 60/286; 60/295

(58) Field of Classification Search .............. 60/624, 60/614, 612, 286, 295, 605.2; 123/562
See application file for complete search history.

(56) References Cited

U.S. PATENT DOCUMENTS

| | | | |
|---|---|---|---|
| 5,056,315 A * | 10/1991 | Jenkins | 60/614 |
| 6,539,716 B2 * | 4/2003 | Finger et al. | 60/605.2 |
| 6,604,360 B1 | 8/2003 | Vuk | 60/597 |
| 6,886,336 B2 * | 5/2005 | Super et al. | 60/605.2 |
| 6,955,162 B2 * | 10/2005 | Larson et al. | 60/605.2 |
| 7,047,743 B1 | 5/2006 | Stahlhut et al. | 60/608 |
| 2004/0112329 A1 | 6/2004 | Coleman et al. | |
| 2006/0162335 A1 * | 7/2006 | Vuk | 60/612 |
| 2007/0044472 A1 | 3/2007 | Zhang | 60/605.2 |
| 2007/0220864 A1 * | 9/2007 | Haugen | 60/286 |
| 2007/0234721 A1 | 10/2007 | Vuk | 60/608 |
| 2008/0060348 A1 * | 3/2008 | Robel et al. | 60/286 |
| 2009/0218815 A1 * | 9/2009 | Stahlhut et al. | 290/52 |
| 2009/0223220 A1 * | 9/2009 | Vuk | 60/605.2 |
| 2010/0180584 A1 * | 7/2010 | Berger et al. | 60/320 |

FOREIGN PATENT DOCUMENTS

| | | |
|---|---|---|
| EP | 1498594 | 1/2005 |
| EP | 1903197 A2 * | 3/2008 |
| JP | 59203815 A * | 11/1984 |
| JP | 2005069092 | 3/2005 |

* cited by examiner

*Primary Examiner* — Thai Ba Trieu
(74) *Attorney, Agent, or Firm* — Taylor IP, PC

(57) ABSTRACT

A diesel or HHCI engine has an air intake and an exhaust for products of combustion. A pair of turbochargers receive the products of combustion in a series relationship and an exhaust aftertreatment device receive the products of combustion from the downstream turbine. A power turbine receives the output from the exhaust aftertreatment device and an EGR system of the power turbine passes a selected portion of the output to a point upstream of the upstream turbocharger compressor. A device adds fuel to the aftertreatment device to regenerate the particulate filter and the power turbine recoups the additional energy. The power turbine may be used to drive accessories or the prime output of the engine.

13 Claims, 1 Drawing Sheet

LOW EMISSION TURBO COMPOUND ENGINE SYSTEM

GOVERNMENT RIGHTS IN PATENT

The invention described herein was made with the proceeds from government contract no. DE-FC26-05NT42422 awarded by the Department of Energy. The U.S. government may have certain rights in this patent.

FIELD OF THE INVENTION

The present invention relates to prime mover engine systems and more specifically to such systems having aftertreatment and turbocompounding devices.

BACKGROUND OF THE INVENTION

The evermore stringent Environmental Protection Agency (EPA) limitations represented by the Tier 4 reduction of emissions has required significant development in the area of treating the exhaust from the engine to reduce oxides of nitrogen. For internal combustion engines operating on a compression ignition cycle or a homogenous charge compression ignition cycle (HCCI) there is an extra requirement of reducing particulates in the exhaust system so that these particulates are not released to the atmosphere. Such aftertreatment devices require periodic elevation of their temperatures to a point where the carbon particles trapped on the interstices of a particulate filter self combust. Such a process requires additional fuel or other energy form and reduces the efficiency of such an engine system.

In addition to the exhaust aftertreatment of reducing particulates, many current engines use exhaust gas recirculation (EGR) to recycle some of the products of combustion to the intake of the engine to reduce combustion temperatures by virtue of additional quantities of nitrogen. While these systems have been effective in accomplishing this purpose, they are difficult to manage throughout a complex, heavy duty operating cycle. Frequently, such systems require complex control systems whether they be high pressure EGR systems before the turbocharger or low pressure EGR systems, after the turbocharger. Approaches have been used to reduce energy losses by cooling the EGR which adds an additional level of problems to be overcome in terms of acidic condensation in the engine intake.

What is needed therefore is a prime mover system in which energy consumed in which the efficiency of such systems is improved and operating flexibility is achieved.

SUMMARY OF THE INVENTION

In one form, the invention includes an air breathing, fuel consuming, internal combustion engine having an air intake and an exhaust for products of combustion. At least one turbocharger having a turbine receives the products of combustion from the engine exhaust and a compressor driven by the turbocharger pressurizes air for delivery to the engine intake. An exhaust aftertreatment device receives the products of combustion from the turbine. A power turbine receives the output from the exhaust aftertreatment device. An EGR system is provided downstream of and receives the output from the power turbine for selectively passing a selected portion of the output from the power turbine to a point upstream of the turbocharger compressor.

In another form, the invention is a method of operating a prime mover system including the steps of operating an air breathing, fuel consuming, internal combustion engine having an air intake and an exhaust for products of combustion. At least one turbocharger has a turbine which receives the products of combustion in turn to drive a compressor to pressurize air for delivery to the engine intake. The products of combustion discharged from the turbocharger turbine are subjected to treatment. The products of combustion are then subsequently passed over a power turbine and a selected portion of the output from the power turbine is passed to a point upstream of the turbocharger compressor.

DETAILED DESCRIPTION OF THE INVENTION

Figure 1:
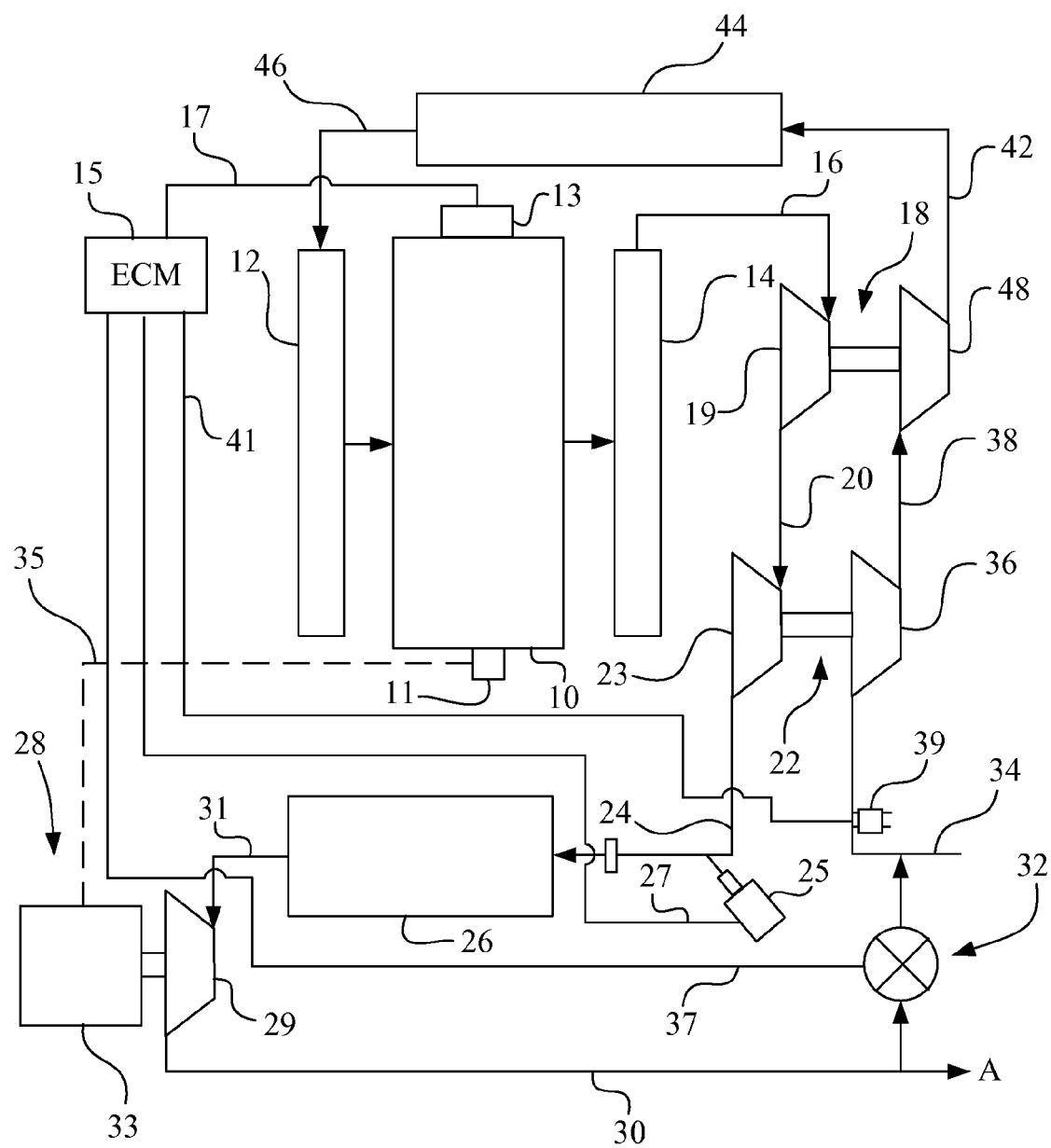
FIG. 1 shows a schematic diagram of a prime mover system embodying the present invention.

FIG. 1 shows a prime mover system incorporating an internal combustion engine 10 providing a rotary output through output shaft 11. Internal combustion engine 10 is an air breathing, fuel consuming, engine receiving intake air from an intake manifold 12 and delivering it, after combustion, to an exhaust manifold 14. The internal combustion engine 10 may be one of a number of types of engines having a multiplicity of cylinders reciprocating within cylinder bores and connected to the output shaft 11 through a crankshaft to produce a rotary torque output. An appropriate valve mechanism is provided to provide intake air to the cylinders and pre-selected quantities of fuel, at the appropriate time in the cycle, is delivered to the engine by a fuel system, schematically indicated by reference character 13.

Fuel system 13 may be a system that operates on the heat of compression within the cylinders to ignite measured and timed quantities of fuel in so that the fuel ignites by the heat of compression to produce a combustible mixture which passes to exhaust manifold 14 after it expands and does work on pistons to rotate output shaft 11. Fuel system 13 may also be of a type that provides a homogenous charge by mixing fuel within the intake 12 so that it passes from intake manifold as a fuel/air mixture to the engine 10. Many different configurations of homogenous charge compression HCCI engines and compression engines may be employed including systems that provide operation in one, or the other, or both configurations. The fuel system 13 is controlled by an ECM 15 through line 17. Line 17 frequently is a series of electrical interconnections between the ECM and the fuel system. Line 17 also preferably connects to a multiplicity of sensors (not shown) that transmit to the ECM 15 various operating parameters with which to control the fuel timing and quantity.

The products of combustion in exhaust manifold 14 pass through exhaust line 16 to a turbocharger 18 incorporating a turbine 19. Products of combustion pass over turbine 19 and may be delivered directly to an exhaust aftertreatment device, or in the case illustrated, through an exhaust line 20 to the turbine 23 of a second turbocharger 22 to further extract energy in the exhaust products of combustion of engine 10. Turbine 23 is connected to a line 24 that passes the products of combustion to an exhaust aftertreatment device 26.

Exhaust aftertreatment device 26 frequently includes a particulate filter having filtration media capable of withstanding high temperature with which to collect carbon particles arising from the combustion cycle in the engine 10. Exhaust aftertreatment 26 may also include a catalyst to convert the oxides of nitrogen into less harmful and deleterious forms. In order to prevent clogging of the particulate filter within exhaust aftertreatment device 26, it is necessary to burn off such carbon particles, usually by raising the temperature to above approximately 600 degrees centigrade. Some forms of accomplishing this may be electrical in nature in which a suitable source of electricity is passed to heaters into the upstream of exhaust aftertreatment 26 to raise its temperature. Alternatively, the mode of increasing the exhaust system temperature may be a device 25 receiving an appropriate supply of fuel from a source (not shown) and injecting it in the exhaust upstream of exhaust aftertreatment device 26 to increase the temperature to above approximately 600 degrees centigrade. As herein illustrated, a line 27 connects the device 25 to the ECM 15 which provides a common and integrated control of the functions of the system. The output from the exhaust aftertreatment device 26 passes through line 31 to the power turbine 29 of a turbo compound device 28.

Turbo compound device 28 may have a load 33 which may be any form of accessory load or a device coupling the power turbine 29 to the rotary output shaft 11 by dashed line 35. This connection may be mechanical, hydraulic or electrical. The connection may also be to various accessory components of engine 10 such as coolant circulation, hydraulic accessory drives and other elements in the system. The products of combustion from power turbine 29 pass from line 30 to ambient A having the maximum energy taken out of the gas energy in the form of pressure and temperature taken out by turbines 19 and 23 and power turbine 29.

The gasses from line 30 are selectively connected to intake line 34 by an EGR system 32. Line 34 receives air that has been filtered from the ambient for use by the engine 10. The EGR device may take many forms but in typical form it is may be a variable valve assembly for selectively passing a controlled portion of the gasses from line 30 to line 34. The EGR device 32 is typically controlled by a line 37 extending to the ECM 15 for implementing the common integrated control of the device. The EGR valve may be actuated to recirculate gasses by a sensor 39 exposed to line 34 and providing a signal to ECM 15 by a line 41. The parameters sensed by sensor 39 may be humidity, temperature or a combination of both as later described. Line 34 extends to the intake of a compressor 36 driven by turbine 23 to pressurize air for delivery through a line 38 which in turn extends to the inlet of a compressor 48 driven by turbine 19. The discharge from compressor 48 extends via line 42 to an aftercooler or intercooler 44 where the pressurized air is cooled to increase its density and thus provide a greater charge density within engine 10. A line 46 connects the output of intercooler 44 to the intake of engine 12.

In operation, engine 10 receives appropriate fuel quantities from fuel injection system 13 as controlled by the ECM 15 to produce a combustible mixture which is ignited according to the particular cycle used within the cylinders of engine 10 and discharged to exhaust manifold 14. From there, it passes over turbine 19 and preferably additional turbine 23 thereby providing staged pressurization of air by compressors 36 and 48. The output of turbine 23 is connected to the exhaust aftertreatment device 26 and from there to power turbine 29 where energy is recouped by the device 33 to be utilized by the engine 10, either in accessory drives or contributing to the primary power output in shaft 11. This configuration extracts the maximum energy out of the engine exhaust stream to provide highest efficiency. Because the pressure, as well as the temperature, has been substantially reduced by the extraction of energy, the exhaust gases 32 have already been cooled for a point where they have a minimal adverse effect on the density of the charge passing to intake 12 of the engine 10.

The sensor 39 is integrated with the ECM 15 so that EGR does not occur under conditions where there is excessive condensation so as to avoid chemical reaction with the gases to produce acidic constituents. Temperature may also be used to provide this function or a combination of the two may be employed.

The particulates collected in the exhaust aftertreatment device 26 are, as illustrated, burned off by the injection of hydrocarbons by the device 25. This in turn raises the temperature of the exhaust aftertreatment device 26 to burn off the carbon particles and, in addition, increases the energy level of the gases discharged into line 31. Because the exhaust from line 31 passes over power turbine 29, the energy that is otherwise lost to ambient A through line 30 is connected to device 33 for utilization by engine 10. In addition to recouping energy otherwise lost during the regeneration cycle, the system may be programmed so that the ECM 15 selectively increases the energy level of the gases in line 31 to produce additional power in power turbine 29 to drive the device 33, for example an auger system in agricultural processing equipment.

The above system provides extremely low emissions thus satisfying stricter requirements like Tier 4. While doing this however, it maximizes the efficiency and energy recovery of the overall system.

Having described the preferred embodiment, it will become apparent that various modifications can be made without departing from the scope of the invention as defined in the accompanying claims.

The invention claimed is:

1. A method of operating a prime mover system comprising the steps of:
   operating an air breathing fuel consuming internal combustion engine having an air intake manifold and an exhaust manifold for products of combustion;
   receiving the products of combustion from said engine and passing them over at least one turbine of a turbocharger, said turbine being connected to a compressor for pressurizing air to the intake of said engine;
   receiving the products of combustion from said turbine and passing them through an exhaust aftertreatment device to at least collect carbon particulates;
   receiving the products of combustion from said exhaust aftertreatment device and passing them across a power turbine for extracting energy;
   powering an engine accessory with said power turbine whereby power is available to said engine during regeneration;
   selectively passing the products of combustion from said power turbine to the intake of said engine upstream of said compressor, and
   burning off carbon particles from said exhaust aftertreatment device thereby increasing the energy in said products of combustion.

2. The method as claimed in claim 1, wherein the products of combustion are passed over a pair of turbines for turbochargers positioned between said exhaust manifold and said exhaust aftertreatment device.

3. The method as claimed in claim 1, wherein said step of burning off carbon includes applying fuel to said products of combustion upstream from said exhaust aftertreatment device.

4. The method as claimed in claim 3, wherein said step adds energy to said products of combustion.

5. The method as claimed in claim 4, wherein said step of adding energy is selectively controlled to add energy on demand.

6. A prime mover system comprising:
   an air breathing, fuel consuming, internal combustion engine having an air intake manifold and an exhaust manifold for products of combustion;

at least one turbocharger having a turbine receiving products of combustion from said exhaust manifold and a compressor driven by said turbine pressurizing air for delivery to said intake manifold;

an exhaust aftertreatment device downstream of and receiving the products of combustion from said turbine;

a power turbine receiving the products of combustion from said exhaust aftertreatment device;

an engine accessory device powered by said power turbine; and, an EGR system downstream of and exposed to the products of combustion from said power turbine for selectively passing a selected portion of the products of combustion from said power turbine to a point upstream of said compressor, wherein said exhaust aftertreatment device collects particulates and said system further comprises a regeneration system for burning particles off said exhaust aftertreatment device.

7. The prime mover system as claimed in claim 6, having two turbochargers.

8. The prime mover system as claimed in claim 6, wherein said regeneration system adds fuel to the products of combustion flow upstream of said exhaust aftertreatment device.

9. The prime mover system as claimed in claim 8, wherein said fuel adds energy to said products of combustion.

10. The prime mover system as claimed in claim 9, further comprising a controller to selectively add energy to said products of combustion.

11. The prime mover system as claimed in claim 10, wherein said engine is selectively controlled to make power available to said power turbine. comprising a controller to selectively add energy to said products of combustion.

12. The prime mover system as claimed in claim 6, wherein said EGR is controlled to pass products of combustion responsive to one of condensation at the inlet to said compressor and temperature at that location.

13. The method as claimed in claim 6, wherein said step of recirculating the exhaust is responsive to one of moisture sensor and temperature to the inlet of said compressor.

\* \* \* \* \*

UNITED STATES PATENT AND TRADEMARK OFFICE
CERTIFICATE OF CORRECTION

| | | |
|---|---|---|
| PATENT NO. | : 7,950,231 B2 | Page 1 of 1 |
| APPLICATION NO. | : 11/925128 | |
| DATED | : May 31, 2011 | |
| INVENTOR(S) | : Carl T. Vuk | |

It is certified that error appears in the above-identified patent and that said Letters Patent is hereby corrected as shown below:

COLUMN 6
    At lines 11 and 12, after "available to said power turbine.", please delete "comprising a controller to selectively add energy to said products of combustion."

Signed and Sealed this
Twentieth Day of December, 2011

David J. Kappos
*Director of the United States Patent and Trademark Office*